Nov. 10, 1942.   W. H. CAPEN   2,301,251
TIRE INSPECTION APPARATUS
Filed Dec. 13, 1939   4 Sheets-Sheet 1
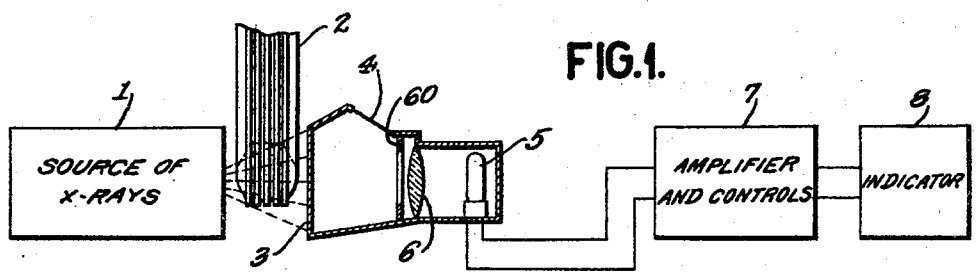
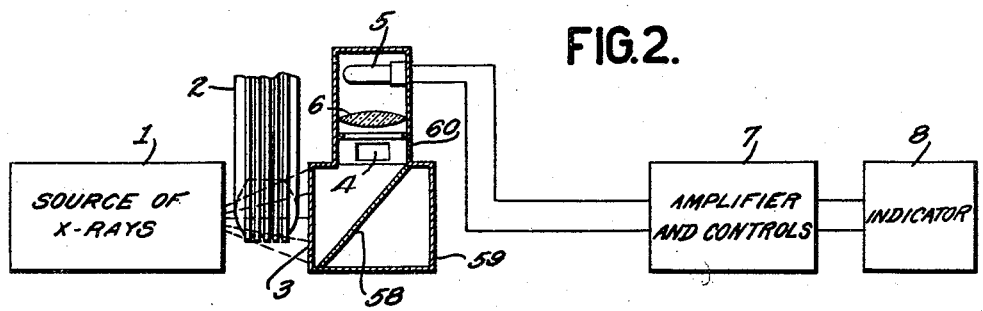
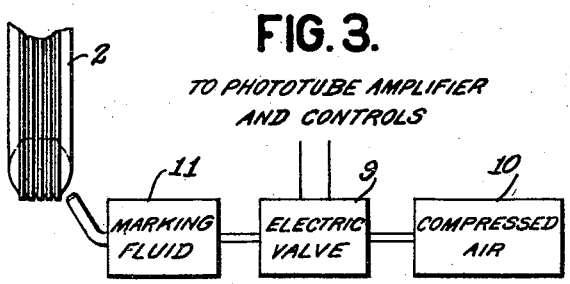
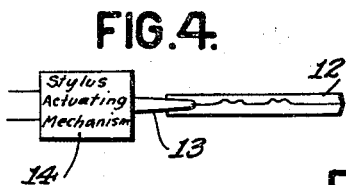
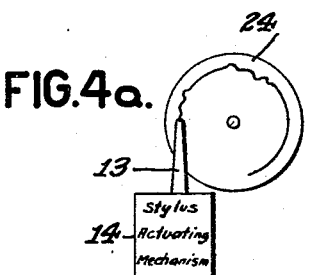
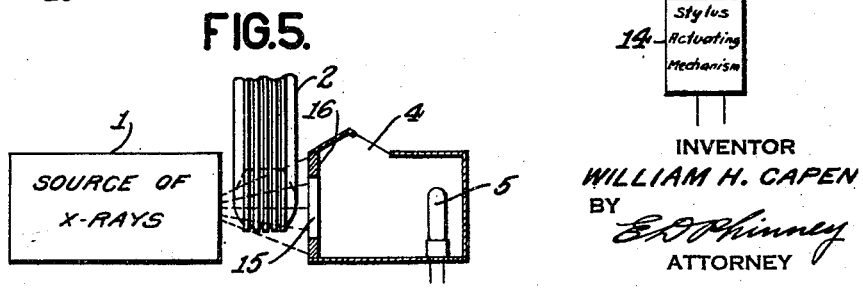
INVENTOR
WILLIAM H. CAPEN
BY
ATTORNEY Nov. 10, 1942. W. H. CAPEN 2,301,251
TIRE INSPECTION APPARATUS
Filed Dec. 13, 1939   4 Sheets-Sheet 2

INVENTOR
WILLIAM H. CAPEN
BY
ATTORNEY

Nov. 10, 1942.  W. H. CAPEN  2,301,251
TIRE INSPECTION APPARATUS
Filed Dec. 13, 1939   4 Sheets-Sheet 3
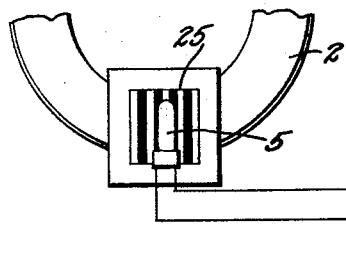
FIG.10.
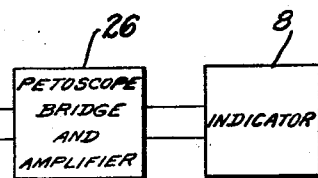
FIG.11.
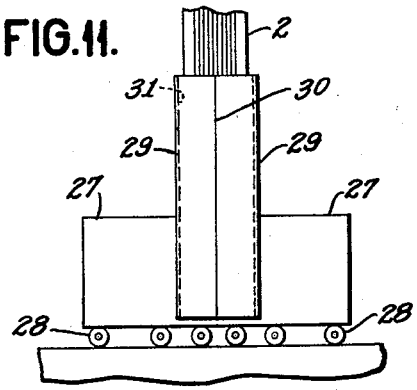
FIG.12.
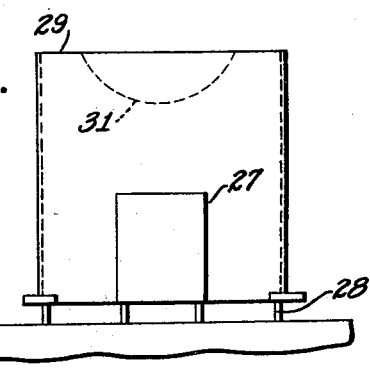
FIG.13.
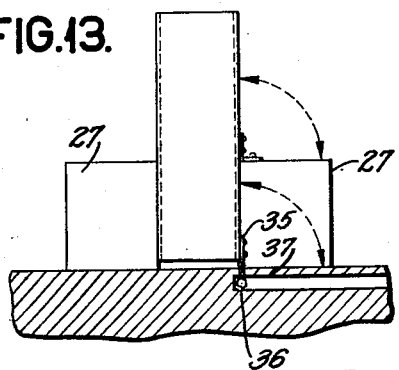
FIG.14.
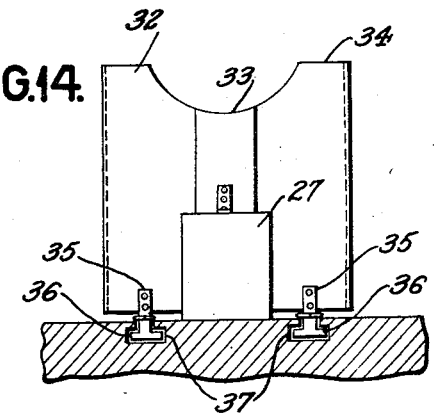
FIG.15.
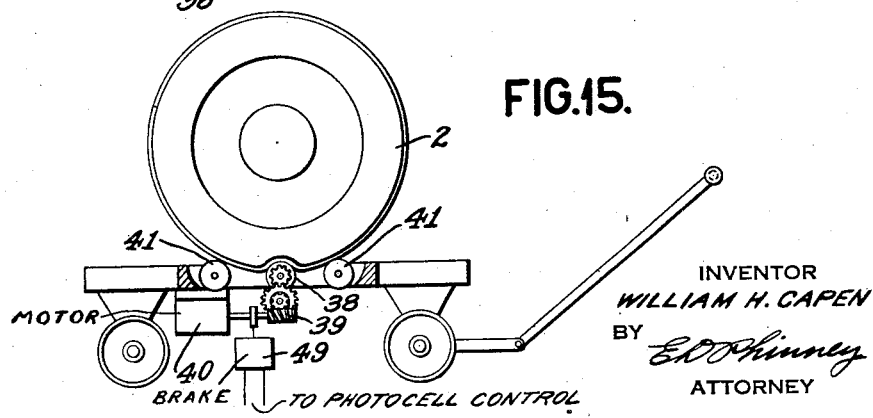
INVENTOR
WILLIAM H. CAPEN
BY
ATTORNEY Nov. 10, 1942. W. H. CAPEN 2,301,251
TIRE INSPECTION APPARATUS
Filed Dec. 13, 1939 4 Sheets-Sheet 4

INVENTOR
WILLIAM H. CAPEN
BY
ATTORNEY

Patented Nov. 10, 1942

2,301,251

UNITED STATES PATENT OFFICE 2,301,251

TIRE INSPECTION APPARATUS

William H. Capen, Mountain Lakes, N. J., assignor to International Standard Electric Corporation, New York, N. Y., a corporation of Delaware Application December 13, 1939, Serial No. 308,919

22 Claims. (Cl. 250—52)

My invention relates to the art of tire inspection and more specifically to an improved method of inspecting automobile tires by means of X-rays.

An object of my invention is to provide apparatus permitting rapid inspection of automobile tires for hidden cuts, bruises, imbedded foreign material or other defects.

A further object of my invention is to provide auxiliary apparatus giving automatic indication of faults occurring in tires under inspection and for making a record of such faults.

A further object of my invention is to provide mountings for the inspection apparatus that facilitates the placing of a tire to be inspected in the inspection apparatus.

A further object of my invention is to provide adjustable X-ray shields for use with the inspection apparatus.

Small particles, such as nails, glass, gravel and the like, frequently become imbedded in the rubber or fabric of automobile tires. These particles are not readily detected by visual inspection and in the course of time work through the tire itself and puncture the pneumatic tube contained in the tire. In travel along highways a puncture may be quite dangerous and frequently leads to considerable destruction or loss of life.

The woven casing or fabric threads of a tire may develop gashes or weak spots due to tire bruises or tire age. This type of damage to the tire cannot be readily detected since it is ordinarily on the inside of the tire and is usually the most dangerous type since it leads to blow-outs and rapid deflation of the tire.

My invention is particularly useful to agencies whose interests are concerned with safety and dependability and likewise to tire sales organizations. Large busses for passenger service now travel at high speeds over the highways and it is vital for the safety of the passengers that such busses have tires which are free from hidden defects which might cause blow-outs and resulting destruction as well as punctures and attendant delays. Trucks and other vehicles doing rapid delivery service or carrying perishable goods depend upon continuity of service. The puncture of a tire of such a vehicle often causes considerable delay. My invention provides a method and means for rapid and easy inspection of tires on such vehicles so that the tires may be maintained in good condition at all times.

In accordance with my invention I propose to use a source of X-rays directed on a tire, and to view the rays after passing through said tire, by a fluorescent screen and a photo-cell adapted to sound an alarm, mark the tire at the point of defect or make a permanent record of any tire defects or to perform both these functions. A further embodiment of my invention provides a pit or floor mounting for inspection apparatus and adjustable shields for use with the apparatus to reduce the amount of rays escaping.

The attached drawings serve to more clearly illustrate my invention, wherein:

Fig. 1 is an embodiment of my invention showing a method of directly or indirectly inspecting tires by means of X-rays;

Fig. 2 is an alternative construction of the embodiment of Fig. 1;

Fig. 3 shows an auxiliary device for use with the apparatus of Fig. 1 for automatically marking a tire at a point of defect;

Figs. 4 and 4a illustrate the use of a stylus and record tape or disc as an indicator in connection with the apparatus of Fig. 1;

Figs. 5 and 5a show the use of a focussing device in the apparatus receiving the X-rays for focussing the rays and allowing both direct and indirect inspection of a tire;

Fig. 10 shows the incorporation of a Petoscope with the apparatus of my invention;

Figs. 11 and 12 are side and front views of a special arrangement of shielding;

Figs. 13 and 14 are front and side views of a further development of the special shielding;

Fig. 15 shows apparatus for applying pressure to the surface of a tire to cause a deflection thereof, and simultaneously rotating the tire;

Figure 5A:
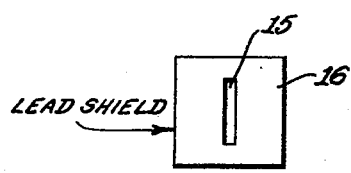

In Fig. 1, X-rays from a source 1 of a well known type are directed upon a tire 2. The X-rays after passing through the tire strike the fluorescent screen 3 and the resultant visible image may be directly viewed through the window 4 or focussed upon the photo-cell 5 by means of lead glass lens 6. The photo-cell 5 is connected to an amplifier and auxiliary controls 7 for operating an indicator 8 which may be an audible signal, a recording tape, a warning light, a meter, a braking device for stopping rotation of the tire, or a combination of these devices. To minimize the interference of direct X-rays with the operation of the photo-cell the fluorescent layer should be applied to a lead glass sheet. In the preferred embodiment of my invention a shield 60 provided with a narrow slit is placed in front of the lens 6 to narrow the field viewed by the cell 5 and to increase the percentage of the total area occupied by a defect, thus making the apparatus more sensitive to small objects.

Fig. 2 illustrates an alternative construction of the apparatus of Fig. 1. As shown, the image of the fluorescent screen 3 is viewed in the mirror 58 by the photo-cell and associated lens 6. This type of construction removes the necessity of shielding the photo-cell 5 from the direct X-rays, and the parts such as the lens 6, mirror 58, and screen 3 need not be made of lead glass. The box 59 should be made of lead to confine the direct rays. It is also possible to make this arrangement direct viewing only or to combine both the direct and the photo-cell viewing e. g. by providing a window 4 as shown in Fig. 2.

In Fig. 3 an electric valve 9 is shown and is adapted for use with the amplifier and controls 7 of Fig. 1. The valve 9 controls the flow of air from tank 10 to a spray gun 11 containing a liquid paint or other marking fluid. The valve operates when the amount of X-rays passing from the source to the cell alters by a predetermined amount. The gun 11 then projects a spot or line on the tire at the point where the defect exists. The use of a device of this type allows fairly rapid rotation of the tire, and all faults may be repaired at one time since a tire may be completely inspected, removed from the apparatus, and repaired at the points marked.

In Fig. 4, a tape 12 preferably driven at a linear rate corresponding to the periphery speed of the tire under inspection is marked according to the fluctuations of the stylus 13. The stylus actuating mechanism 14 may be driven from the photo-cell amplifier and controls of Fig. 1. The use of a tape of this type has the advantages of the marking gun of Fig. 3 in that a complete tire may be inspected by means of X-rays, then removed from the apparatus, and the defects remedied or the foreign matter removed from the tire by comparsion with its record while the apparatus is free for use. The tape gives a permanent record of the tire for later comparison and is an aid in removing foreign matter since the markings on the tape will give an indication of the location of the matter relative to the periphery of the tire.

To provide a better comparison between the marking given by the stylus 13 of the indicating apparatus shown in Fig. 4 and a fault or defect in the tire under inspection, it may be desirable to use a recording disc 24 as shown in Fig. 4a. This disc is preferably driven at a speed synchronous with the speed of rotation of the tire under inspection, and it is therefore evident that fluctuations of the stylus will provide markings on the disc that may be easily compared with the periphery of the tire.

If several inspecting devices are used simultaneously, as, for example, for examining tires on four wheels at once, it becomes desirable to provide some relation between the point on the tire at which the inspection is started and the markings on the record disc or tape. In this case, each of the tires may be preliminarily rotated so that the inspection starts at a fixed mark carried by the tire, or the discs or tape may be provided with a mark at some point and the record be rotated or moved until the mark thereon corresponds in position to the tire valve, trade mark, serial number or other mark on the tire. It is further possible to note the position of some mark on the tire and make a corresponding mark on the record disc or tape.

The alteration in the amount of X-rays going from the source to the receiving apparatus caused by breaks or foreign matter in the tire is not very great. One of the principal reasons for this is the lack of focussing of the X-rays, the X-rays that pass through the tire being deflected and registering at random on the fluorescent screen and hence causing interference. To remedy this I propose the making of a rectangular slit 15 in the lead plate 16 as shown in Figs. 5 and 5a. Lead plate 16 in these figures takes the place of the fluorescent screen as shown at 3 in Fig. 1. The plate due to its thickness will eliminate a number of the scattered rays and will tend to receive chiefly the rays that come directly from the source. In the preferred form the slit is very narrow, but if desired, illumination may be provided and the slit made wide enough to allow direct visual inspection of the tire when a break in the tire appears before the slit. The tire may then be inspected through the window 4 at the point where a defect exists without removing the tire from the apparatus. If the focussing effect at the receiving end is not necessary, a fluorescent screen may be used at 16 and a slit provided in the fluorescent screen to allow direct viewing of the tire when a fault appears.

Figure 6:
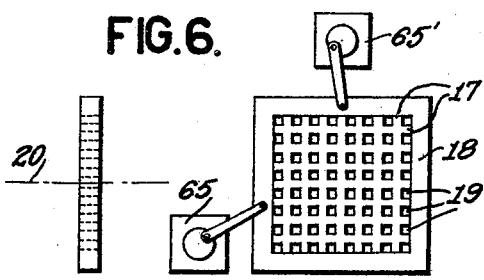
Fig. 6 illustrates a grid for preventing spreading of the X-rays.

In Fig. 6, another method of focussing the X-rays is illustrated in the lead grid 17. This grid is provided with a framework 18 and holes 19. The operation of this grid may be described by realizing that there are rays approaching the grid at various angles. The rays that have no angle or a small angle with respect to a perpendicular 20 to the grid will pass through the holes, whereas those rays that have a large angle will be absorbed by the lead structure. The grid may be employed either at the source for focussing the rays before passing through the tire, or at the receiving end for receiving only the direct rays. To prevent any shadows due to the framework 18, I provide an oscillating means 65 and 65' which move the grid at a definite rate in the well known manner.

Figure 7:
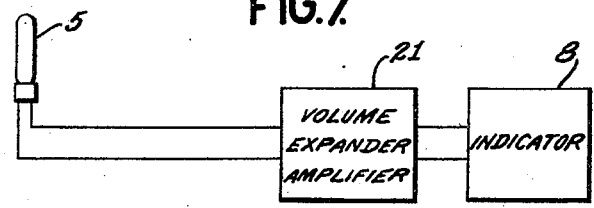
Fig. 7 is a diagram of a circuit including a special type of amplifier for use with a photo-cell.

Since the change in density of the rays passing through the tire is not very great, the receiving apparatus must be very sensitive. A linear type of amplifier connected to the photo-cell would amplify all changes in the intensity of the rays equally. To gain larger contrast I propose the use of a volume expander amplifier which has a variable gain, the gain being greater for a high amplitude signal than a low amplitude signal. As shown in Fig. 7 the amplifier 21 may replace the amplifier used with the photo-cell 5, or be used in conjunction with the ordinary amplifier to operate the indicator 8. By this means it is possible to obtain larger degrees of contrast between the conditions that exist when there is no defect in the tire and the conditions that exist with a break or foreign material in the tire.

Figure 8:
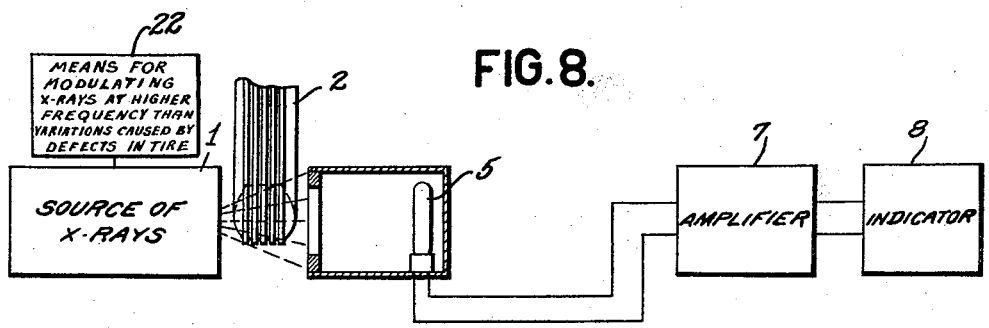
Fig. 8 illustrates the use of a modulator with the source of X-rays for producing impulses in the photo-cell circuit.

For most thorough inspection of the tire 2 the tire is rotated at a slow rate of speed. When the tire is rotated slowly, a defect in the tire will alter the X-rays in such a manner that only a small change in the photo-cell current will occur, and this current will, of course, change slowly. It is relatively difficult to amplify this small rate of change of current, and hence a means that will change the slowly varying photo-cell current into a relatively high frequency modulating current will simplify the means of amplifying any change in the photo-cell current. One method of accomplishing this is to modulate the source of X-rays 1 in a known manner (e. g. by varying the potential of the X-ray anode or by deflecting the electron stream producing the X-rays) by means of the modulator 22, as shown in Fig. 8. The recording apparatus in this case may be of any of the types shown in the previous figures.

Figure 9:
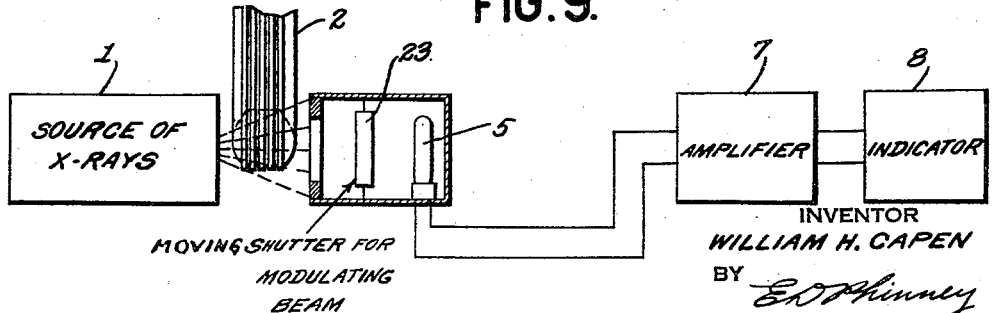
Fig. 9 illustrates another method of introducing impulses into the photo-cell circuit by means of a shutter.

It may, however, be preferable to use another method of varying the photo-cell current at a fixed rate as shown in Fig. 9. In this figure, a shutter 23 in the path of the X-rays from the source 1 and driven at any convenient rate interrupts the rays coming from the source 1 and passing to the photo-cell 5, thereby causing a pulsating current to appear in the photo-cell circuit whose amplitude varies in proportion to the intensity of the transmitted X-rays. While in the preferred embodiment the shutter is shown as closely associated with the photo-cell, the shutter may be located at any point between the source and the photo-cell.

In the course of inspection of a large number of tires, it is evident that the tires will not be uniform but will vary in density. Using apparatus of the ordinary type, an adjustment would be necessary on the indicating or alarm device used in conjunction with the photo-cell every time a tire of different density is placed in the apparatus. To allow inspection of tires of all densities without adjustments on the receiving apparatus, I propose the use of a Petoscope of the type shown in the patent to Fitzgerald 2,016,036. The use of a Petoscope, which may be of the single or double type, prevents alteration in the currents in the receiving apparatus due to average field intensity changes, but the Petoscope registers all changes in the field that pass by the grating of the Petoscope. An embodiment of this arrangement is shown in Fig. 10. The grating of the Petoscope 25 is arranged to divide the field of view so that the Petoscope cell will register the passage of a break or foreign matter in the tire when the defect passes laterally in front of the grating. The photo-cell 5 associated with the grating is connected to the Petoscope bridge and amplifier 26, which can also be used to operate an indicating device 8. The use of a Petoscope has the further advantage that since the field of view is divided up into small areas by a grating a small object moving past this grating will produce alternating or pulsating currents in the photo-cell circuit which may be more easily amplified.

Figs. 11 and 12 show side and front views of a special shield of my invention. As is well known X-rays must be shielded to prevent injury to an operator of the X-ray apparatus, and one of the best materials for this use is lead. When lead shielding is used a great deal of weight is added to the apparatus, and it is very advantageous to mount the apparatus on wheels or provide some mechanical means for moving and adjusting the shields and the housings enclosing the X-ray equipment and the receiving equipment. In these figures the lead boxes 27 are supported on rollers 28 which may be guided by rails. Attached to these boxes are lead shields 29 which join at the point 30. The shields of general rectangular shape are so designed as to surround the lower part of the tire under inspection. A semi-circular cut 31 may also be made in one or both sides of the shields to avoid interference with apparatus associated with a wheel of a vehicle. The tire 2 is first placed in position and the shields are slid into place near the walls of the tire, thus effectively shielding the equipment from the escape of X-rays.

Figs. 13 and 14 show how the shields of Figs. 11 and 12 may be subdivided to allow easy adjustment. Different types of vehicles have apparatus associated with their wheels which vary in size and shape from vehicle to vehicle as well as from wheel to wheel. It is therefore desirable to make the shielding adjustable so that the shielding may be as near to the tire as possible. The sections 32, 33 and 34 are separate from one another and are hinged to their supporting base by the hinges 35. These hinges may in turn be supported by T-shaped heads 36 which run in grooves 37. This particular arrangement of hinges and grooves allows the shields or screens to be slid toward the tire or laterally with respect to the tire. It is also possible to make the hinges and shields readily removable so that shields of different heights may be inserted in place for vehicles of different size. When the shields are not in use they may be lowered to the base, in the manner shown by dotted arcs in Fig. 13.

While a tire may be inspected without any pressure on its surface, the defects are more likely to be detected if a pressure is applied to the tire. An embodiment of this arrangement is shown in Fig. 15. A roller 38 driven by gears 39 and motor 40 supports the tire 2. The tire may be forced down on a roller 38 by the weight of the vehicle to which it is attached or by same other means. Two idler rollers 41 serve to hold the wheel from moving forward or backward. Contact with the roller causes the tire to bulge in a manner similar to the bulging that occurs when the tire is in use. Since the roller is driven, it will cause the tire to rotate, thus allowing uninterrupted inspection of the complete tire. It is also possible to use only three idler rollers without the addition of a driving means, the tire being rotated by hand. The motor, however, is a convenience since it would be difficult to rotate the tire when the shields are in place.

A brake 49 may be attached to the rollers or the motor shaft of Fig. 15, and this brake can be attached to the photo-cell amplifier and controls so that the rotation of the tire will be stopped when the X-rays coming from the source and passing through the tire are varied within predetermined limits.

Figure 16:
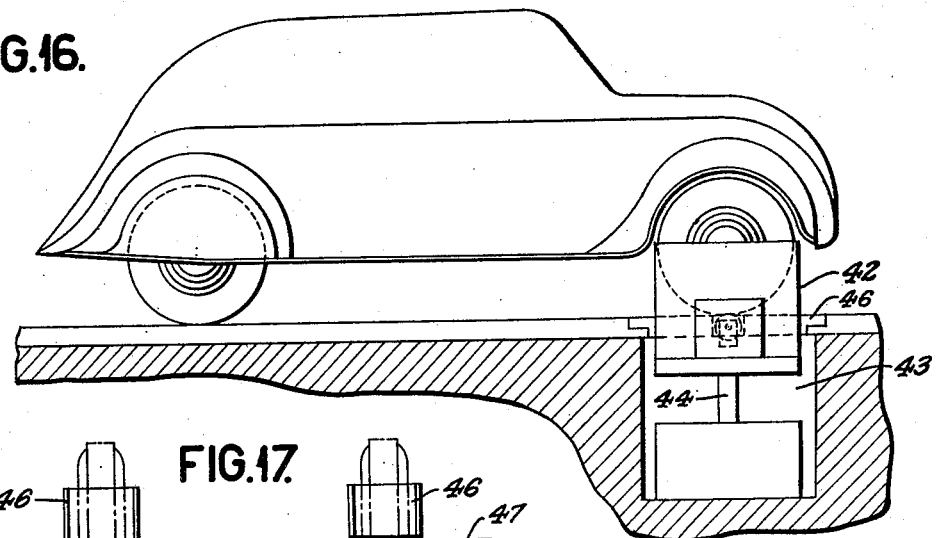
Fig. 16 is an example of pit mounting of the apparatus of my invention.

To facilitate the inspection of tires on a large number of vehicles I propose mounting my equipment in a pit 43 shown in Fig. 16. The apparatus is supported on a hydraulic jack 44, and by this arrangement it is possible to lower the apparatus when not in use. The vehicle is driven over the pit as shown in the figure, and the apparatus raised by the jack 44, lifting the wheel and tire so that they may be rotated and the tire inspected.

Figure 17:
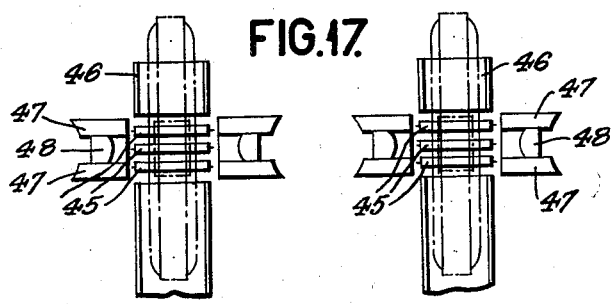
Fig. 17 is an example of floor mounting of the apparatus of my invention.

In case it is not practical to employ a pit and hydraulic jack in the location where X-ray apparatus is to be installed, the apparatus may be installed as shown in Fig. 17. Rollers 45 similar to those of Fig. 15, are inserted below the level of a guide or channel 46. The vehicle is driven onto the guides so that the tires to be inspected rest on the rollers 45. The hinged shields 47 of a construction similar to that shown in Figs. 13 and 14 rest on the floor or a base or are set therein so that they will not obstruct the passage of a vehicle on the guides 46. When the vehicle is in position the shields are swung up to enclose the tire, and one or more tires at a time may be inspected by the two sets of X-ray apparatus 48.

Figure 18:
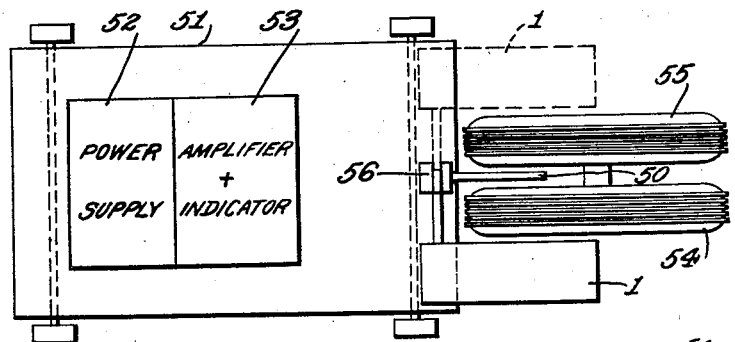
Fig. 18 is a plan view of apparatus for detecting faults in a tire on vehicles provided with dual wheels.

Heavy vehicles are often provided with dual wheels and tires and with the type of inspecting apparatus so far described it is necessary to remove one or both of these wheels and tires to inspect a tire. In Fig. 18 is shown apparatus of my invention by which I intend to eliminate this necessity of removing tires from such vehicles. In this figure is shown a photo-cell encased in a protecting shield 50 and a source of X-rays 1. Shield 50 is for mechanical protection and is of some material such as aluminum which is transparent to X-rays or it may be a lead shield with a slit of the type shown in Fig. 5. I have shown this apparatus mounted on a cart 51 so that the apparatus may be easily moved about. Numeral 52 indicates the power supply apparatus and numeral 53 the indicating apparatus. As shown, the tire 54 may be inspected and then the apparatus removed allowing rotation of the source of X-rays 1 into a position on the opposite side of the cart shown by the dotted lines. In this second position the tire 55 may then be inspected. It is clear that during the inspection of both these tires it is not necessary to remove either of the tires, since the photo-cell and housing may be inserted between the tires and the X-ray source directed to the outside of either tire. The photo-cell shield 50 and the X-ray source are both mounted on a pivot 56 so that they may be easily rotated, the photo-cell preferably following the rotation of the X-ray apparatus.

Figure 20:
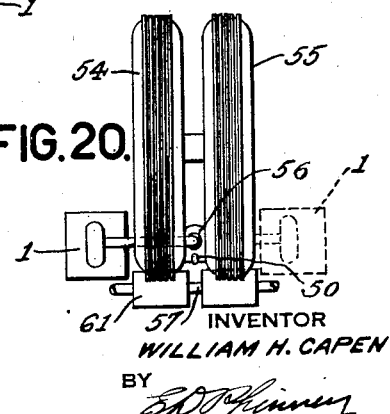
Figs. 19 and 20 are side and front views of a further embodiment of the invention shown in Fig. 17.
Figure 19:
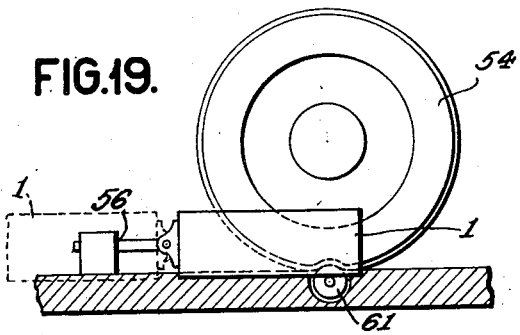

In Figs. 19 and 20 I have shown a further embodiment of the apparatus of Fig. 18. It may be necessary or desirable to mount the X-ray and photo-cell apparatus at a fixed point. In this case, the X-ray source may be made rotatable in two planes. Rotation in one plane is shown in Fig. 19, the rotation in this case being in the plane of the paper. Fig. 20 shows the rotation of the source as seen from the front and is again in the plane of the paper but at right angles to its previous plane of rotation. The procedure in the use of this apparatus for inspecting dual tires would be to have the X-ray source at the position shown in solid lines in Fig. 19 at 1 for the inspection of one tire and to rotate the source outward to the position shown in dotted lines in Fig. 19 (which is also the position shown in solid lines in Fig. 20). The source is then swung sidewise until it is at the position shown by the dotted lines in Fig. 20. A procedure of this type does not call for movement of the pivot 56 of the photo-cell and X-ray source nor movement of the vehicle associated with the tires. A groove 57 may be provided in the roller 61 supporting the tires so that a photo-cell will view an entire cross-section of either of the tires.

I have shown different embodiments of my invention in definite groups, but I do not intend that my invention be confined to the specific forms of groupings shown. For example, if the photo-cell used for detecting the X-rays is sufficiently sensitive and an indicator with that photo-cell were able to operate on the photo-cell output alone, it would be possible to eliminate the use of an amplifier. Furthermore, it would be impossible to use both types of shielding that I have shown at one time, but either type of shielding may be used according to the conditions of the mounting of the inspection apparatus.

The apparatus herein described has been concerned chiefly with tires mounted on vehicles, but the apparatus may be extended to factory use to reveal any manufacturing defects.

While I have described particular embodiments of my invention for purposes of illustration, it will be understood that various modifications and adaptations thereof may be made within the spirit of the invention as set forth in the appended claims.

What is claimed is:

1. An apparatus for inspecting a tire for defects, comprising means for directing X-rays through said tire, X-ray detecting means for producing electrical signals under control of the X-rays which pass through said tire to indicate defects, and an indicator responsive to said detecting means comprising a marking device for marking a point of defect relative to the periphery of said tire.

2. An apparatus for inspecting a tire for defects, comprising means for directing X-rays through said tire, X-ray detecting means for producing electrical signals under control of the X-rays which pass through said tire to indicate defects, and an indicator responsive to said detecting means comprising a recording disc for marking a point of defect relative to the periphery of said tire.

3. An apparatus for inspecting a tire for defects, comprising means for directing X-rays through said tire, X-ray detecting means for producing electrical signals under control of the X-rays which pass through said tire to indicate defects, and an indicator responsive to said detecting means comprising a recording tape for marking a point of defect relative to the periphery of said tire.

4. An apparatus according to claim 1 wherein said device comprises a spray gun and a valve operated by said detecting means.

5. An apparatus for inspecting a tire for defects by means of X-rays, comprising means for directing X-rays through said tire, a fluorescent screen activated by said X-rays which pass through said tire to indicate defects, means for directly viewing said fluorescent screen, a photo-cell responsive to the activation of said screen, and an indicator controlled by said photo-cell for marking a point of defect relative to the periphery of said tire.

6. An apparatus for inspecting a tire for defects, comprising means for directing X-rays through said tire, a fluorescent screen activated by said X-rays which pass through said tire to indicate defects and provided with an aperture, means for directly viewing said tire through said aperture, a photo-cell responsive to the activation of said screen, an amplifier connected to said photo-cell and controlled thereby, and an indicator controlled by said amplifier for marking a point of defect relative to the periphery of said tire.

7. An apparatus for inspecting a tire for defects, comprising means for directing X-rays through said tire, a fluorescent screen activated by the X-rays which pass through said tire to indicate defects, a photo-cell responsive to the activation of said screen, a volume expander amplifier connected to said photo-cell and controlled thereby, and an indicator controlled by said amplifier for marking a point of defect relative to the periphery of said tire.

8. An apparatus for inspecting a tire for defects, comprising means for directing X-rays through said tire, a source of light energy comprising a fluorescent screen activated by the X-rays which pass through said tire to indicate defects, means for deflecting said light energy, a photo-cell responsive to said energy, an indicator controlled by said photo-cell, and means for directly viewing said deflected light energy.

9. An apparatus for inspecting a tire for defects, comprising means for directing X-rays through said tire, a source of light comprising a fluorescent screen activated by the X-rays which pass through said tire to indicate defects, means for deflecting said light, a photo-cell responsive to said light, an amplifier connected to said photo-cell and controlled thereby, and an indicator controlled by said amplifier.

10. An apparatus for inspecting a tire for defects, comprising means for directing X-rays through said tire, a source of light comprising a fluorescent screen activated by the X-rays which pass through said tire to indicate defects, a grating allowing passage of portions of said light, a photo-cell responsive to the light passing through said grating, an amplifier connected to said photo-cell and controlled thereby, and an indicator controlled by said amplifier for marking a point of defect relative to the periphery of said tire.

11. An apparatus for inspecting a tire for defects by means of X-rays, comprising means for producing X-rays, a screen of X-ray absorbing material provided with an aperture allowing passage of X-rays in a predetermined direction, so related to said tire that the X-rays which have passed through said screen then passed through said tire, a fluorescent screen activated by the X-rays which pass through said tire to indicate defects, a photo-cell responsive to the activation of said screen, and an indicator controlled by said photo-cell for marking a point of defect relative to the periphery of said tire.

12. An apparatus for inspecting a tire for defects by means of X-rays, comprising means for directing X-rays through said tire, a source of light comprising a fluorescent screen activated by said X-rays which pass through said tire to indicate defects, means for directly viewing such fluorescent screen, a shield of X-ray absorbing material provided with a narrow aperture allowing passage of light from said source, a photo-cell responsive to the light which passes through said shield, an amplifier connected to said photo-cell and controlled thereby, and an indicator controlled by said amplifier for marking a point of defect relative to the periphery of said tire.

13. An apparatus for inspecting a tire for defects, comprising means for directing X-rays through said tire, a shield of X-ray absorbing material provided with a narrow aperture allowing passage of said rays which pass through said tire to indicate defects, a photo-cell responsive to said rays which pass through said aperture, an amplifier connected to said photo-cell and controlled thereby, and an indicator controlled by said amplifier for marking a point of defect relative to the periphery of said tire.

14. An apparatus for inspecting a tire for defects by X-rays, comprising means for deflecting a portion of said tire, means for directing X-rays through said portion of said tire, means for modulating said rays, shield means to confine said rays, means for detecting the X-rays which pass through said tire to indicate defects, an indicator responsive to said detecting means, and a movable mounting for said means.

15. An apparatus for inspecting a tire for defects by X-rays, comprising means for deflecting a portion of said tire, means for directing X-rays through said portion of said tire, means for modulating said rays, shield means to confine said rays, means for detecting the X-rays which pass through said tire to indicate defects comprising a photo-cell, an amplifier connected to said detecting means and controlled thereby, and an indicator controlled by said amplifier, and a movable mounting for said means.

16. An apparatus for inspecting a tire for defects by X-rays, comprising means for deflecting a portion of said tire, means for directing X-rays through said portion of said tire, means for modulating said rays, shield means to confine said rays, means for detecting the X-rays which pass through said tire to indicate defects comprising a photo-cell, an amplifier connected to said detecting means and controlled thereby, and an indicator controlled by said amplifier, and a mounting for said means supported by a jack and adjustable thereby.

17. An apparatus for inspecting a tire for defects by means of X-rays, comprising means for deflecting a portion of said tire, means for directing X-rays through said portion of said tire, means for modulating said rays, shield means to confine said rays, means for detecting the X-rays which pass through said tire to indicate defects comprising a photo-cell, an amplifier connected to said detecting means and controlled thereby, and an indicator controlled by said amplifier, and a rotatable mounting for said means.

18. An apparatus for inspecting a tire for defects by X-rays, comprising a roller pressing against the surface of said tire for deflecting a portion thereof, means for directing X-rays through said portion of said tire, means for modulating said rays, adjustable shield means to confine said rays, means for detecting said X-rays and indicating a defect in said tire comprising a fluorescent screen activated by X-rays which pass through said tire to indicate defects, means for directly viewing said fluorescent screen, a photo-cell responsive to the activation of said screen, an amplifier connected to said photo-cell and controlled thereby, and an indicator controlled by said amplifier for marking a point of defect relative to the periphery of said tire, and a mounting for said means supported by a jack and adjustable thereby.

19. An apparatus for inspecting a tire for defects by means of X-rays, comprising means for directing X-rays through said tire, a movable shutter for modulating said rays, a fluorescent screen activated by said rays which pass through said tire to indicate defects, a photo-cell responsive to the activation of said screen, and an indicator controlled by said photo-cell for marking a point of defect relative to the periphery of said tire.

20. An apparatus according to claim 18 wherein said roller is mechanically driven.

21. An apparatus according to claim 18 wherein said adjustable shields comprise slidable units hinged to said mounting.

22. An apparatus according to claim 18 wherein said adjustable shields comprise units hinged to said mounting.

WILLIAM H. CAPEN.